US012633612B2

(12) United States Patent
Zhang et al.

(10) Patent No.: US 12,633,612 B2
(45) Date of Patent: May 19, 2026

(54) LOCKING MECHANISM FOR BATTERY PACK, BRACKET ASSEMBLY, ELECTRIC VEHICLE AND LOCKING METHOD FOR BATTERY PACK

(71) Applicants:AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Shanghai (CN); Danliang Qiu, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO.. LTD., Shanghai (CN)

( * ) Notice: Subject to any disclaimer, the term of this patent is extended or adjusted under 35 U.S.C. 154(b) by 915 days.

(21) Appl. No.: 17/912,503

(22) PCT Filed: Mar. 17, 2021

(86) PCT No.: PCT/CN2021/081378
§ 371 (c)(1),
(2) Date: Mar. 16, 2023

(87) PCT Pub. No.: WO2021/185293
PCT Pub. Date: Sep. 23, 2021

(65) Prior Publication Data
US 2024/0234908 A1      Jul. 11, 2024

(30) Foreign Application Priority Data

Mar. 17, 2020      (CN) .......................... 202010188316.3

(51) Int. Cl.
H01M 50/264      (2021.01)
B60K 1/04      (2019.01)
H01M 50/249      (2021.01)

(52) U.S. Cl.
CPC ............. H01M 50/264 (2021.01); B60K 1/04 (2013.01); H01M 50/249 (2021.01);
(Continued)

(58) Field of Classification Search
CPC ............. H01M 50/264; H01M 50/249; H01M 2220/20; B60K 1/04; B60K 2001/0438; B60K 2001/0494
See application file for complete search history.

(56) References Cited

U.S. PATENT DOCUMENTS

| | | | | |
|---|---|---|---|---|
| 11,359,410 B2 * | 6/2022 | Zhang | ..................... | B60L 53/80 |
| 11,912,155 B2 * | 2/2024 | Zhang | ................. | H01M 50/204 |

(Continued)

FOREIGN PATENT DOCUMENTS

| | | | |
|---|---|---|---|
| CN | 201188434 Y | | 1/2009 |
| CN | 202764685 U | * | 3/2013 |

(Continued)

OTHER PUBLICATIONS

Jun. 23, 2021 International Search Report issued in International Patent Application No. PCT/CN2021/081378.
(Continued)

*Primary Examiner* — Jacob B Meyer

(57)      ABSTRACT

A locking mechanism for a battery pack. The locking mechanism comprises a fixing piece, the fixing piece being provided with a locking space. When the battery pack is placed relative to the bracket, the locking mechanism is used to lock a connecting rod on the battery pack. The locking mechanism is provided facing the battery pack on a side of the locking space and is close to an opening of the battery
(Continued)

pack in the vertical direction so that the connecting rod enters the opening along the vertical direction facing the bottom wall of the bracket and moves into the locking space. Thus, the complexity process of installing and fixing a battery pack are effectively reduced, and the reliability of fixation is also ensured. Also provided are a bracket assembly, an electric vehicle and a locking method for a battery pack.

20 Claims, 6 Drawing Sheets

(52) U.S. Cl.
CPC .................. *B60K 2001/0438* (2013.01); *B60K 2001/0494* (2013.01); *H01M 2220/20* (2013.01)

(56) References Cited

U.S. PATENT DOCUMENTS

| | | | | |
|---|---|---|---|---|
| 11,999,438 B2 * | 6/2024 | Schumacher | ....... | H01M 50/202 |
| 12,049,203 B2 * | 7/2024 | Zhang | ........................ | B60S 5/06 |
| 2023/0294499 A1 * | 9/2023 | Zhang | ..................... | B60L 50/66 29/426.1 |
| 2023/0373284 A1 * | 11/2023 | Zhang | ................. | H01M 50/249 |
| 2024/0234908 A1 * | 7/2024 | Zhang | ................. | H01M 50/249 |

FOREIGN PATENT DOCUMENTS

| | | | | | |
|---|---|---|---|---|---|
| CN | 105857048 A | | 8/2016 | | |
| CN | 207089423 U | | 3/2018 | | |
| CN | 108237887 A | | 7/2018 | | |
| CN | 108729760 A | | 11/2018 | | |
| CN | 208746859 U | | 4/2019 | | |
| CN | 109987063 A | | 7/2019 | | |
| CN | 109987067 A | | 7/2019 | | |
| CN | 110001372 A | * | 7/2019 | ......... | H01M 50/264 |
| CN | 209320755 U | | 8/2019 | | |
| CN | 209566780 U | | 11/2019 | | |
| CN | 111391640 A | * | 7/2020 | ............. | B60L 50/64 |
| CN | 112224000 A | * | 1/2021 | ............. | B60L 53/80 |
| CN | 114312445 A | * | 4/2022 | ............. | B60K 1/04 |
| CN | 114987184 A | * | 9/2022 | ............. | B60L 53/80 |
| CN | 115091935 A | * | 9/2022 | ............. | B60L 53/80 |
| CN | 217672122 U | * | 10/2022 | | |
| WO | WO-2019129289 A1 | * | 7/2019 | ......... | H01M 50/262 |
| WO | WO-2021136237 A1 | * | 7/2021 | ............. | B60K 1/04 |

OTHER PUBLICATIONS

Jun. 23, 2021 Written Opinion of the International Searching Authority issued in International Patent Application No. PCT/CN2021/081378.

Jul. 15, 2022 International Preliminary Report on Patentability issued in International Patent Application No. PCT/CN2021/081378.

Dec. 25, 2024 First Office Action issued in Chinese Patent Application No. 202010188316.3.

\* cited by examiner

LOCKING MECHANISM FOR BATTERY PACK, BRACKET ASSEMBLY, ELECTRIC VEHICLE AND LOCKING METHOD FOR BATTERY PACK

The present application is a National Stage of International Application No. PCT/CN2021/081378, filed on Mar. 17, 2021, which claims the priority of Chinese patent application CN2020101883163 filed on Mar. 17, 2020. The contents of the Chinese patent application are incorporated herein by reference in their entireties.

TECHNICAL FIELD

The present disclosure relates to a locking mechanism for a battery pack, a bracket assembly, an electric vehicle and a locking method for a battery pack.

BACKGROUND

The battery settings of existing electric vehicles are generally divided into fixed and replaceable, wherein, the fixed battery is generally fixed on the vehicle, and the vehicle is directly used as a charging object when charging. However, the replaceable battery is generally fixed on a bracket of the vehicle by means of movable installation, wherein the battery can be removed for replacement or charging separately and can be installed on the vehicle again after the replaced battery is charged.

In the prior art, replacement methods of the battery include manual, automatic and other means, and when the battery is installed on the bracket of the vehicle, the bracket needs to lock the battery on the bracket no matter which means is used, which is usually realized by multi-point locking because of the large volume and heavy weight of the battery. For the locking mechanism, how to quickly and conveniently lock or unlock the battery to or from the vehicle bracket is the focus of research and development by existing technicians. The prior art CN109987063U discloses an electric exchange device with a horizontally-assembled-dissembled battery, which is used to assemble a battery box into a battery compartment, or dissemble a battery box from a battery compartment, wherein the battery compartment is provided with a locking groove, and the battery box is provided with a locking bolt; when the battery box is installed in the battery compartment, the locking bolt can be locked in the locking groove. The cooperation of the locking bolt and the locking groove makes the battery box be locked in the battery compartment to prevent the battery box from leaving the battery compartment. CN108729760A discloses a locking device and an AGV using the same, wherein the locking device comprises a fixing frame. A lock catch is rotationally assembled on the fixing frame, a push-bearing part driven by a power source module to rotate forward around a lock catch rotating shaft is arranged on the lock catch, and a locking arm extending in the radial direction of the lock catch rotating shaft is further arranged on the lock catch. The locking arm rotates when the lock catch rotates forward and blocks a lock lug on the power source module in the direction away from the lock catch. The locking device further comprises a blocking piece which is in blocking fit with the lock catch to prevent reverse rotating of the lock catch after the lock lug is blocked. The blocking piece is connected with a driving unit capable of being electrically driven and is driven by the driving unit to block and unblock the lock catch. An elastic piece connected with the lock catch is further arranged on the fixing frame and provides elastic force for reverse rotating of the lock catch, and after the blocking piece unblocks the lock catch, the lock catch is driven to rotate reversely, so that blocking of the lock lug is removed. All of the above locking structures have complex structures, the locking and unlocking processes are cumbersome, and both locking stability and efficiency of locking and unlocking cannot be considered simultaneously.

CONTENT OF THE PRESENT INVENTION

The technical problem to be solved in the present disclosure is to improve the locking stability while taking into account the efficiency of locking and unlocking, and overcome the defects of the complicated process and cumbersome steps of installing the battery pack on the bracket in the prior art, hence providing a locking mechanism for a battery pack, a bracket assembly, an electric vehicle and a locking method for a battery pack.

The present disclosure solves the technical problem by the following technical solutions:

A locking mechanism for a battery pack, provided on a bottom wall of a bracket, wherein the locking mechanism is used to unlock or lock the battery pack from or to the bracket, the locking mechanism comprises a fixing piece, the fixing piece being provided with a locking space, and when the battery pack is placed relative to the bracket, the locking mechanism is used to lock a connecting piece on the battery pack in the locking space;

on a side of the locking space, the locking mechanism is provided with an opening facing towards the battery pack and being close to the battery pack along the vertical direction, so that the connecting piece enters the opening along a vertical direction facing the bottom wall of the bracket and moves into the locking space.

The locking mechanism allows the connecting piece of the battery pack to pass through the opening in the vertical direction and then move into the locking space, and uses the locking space to fix the connecting piece, so that the battery pack can be fixed relative to the bracket when the battery pack is placed on the bracket by the power exchange equipment such as a palletizer, so as to effectively reduce the complexity of the process and the cumbersome steps of installing and fixing the battery pack on the bracket, and also ensure the reliability of the fixing. By setting the locking mechanism on the bottom wall of the bracket, the battery pack is locked during the process of placing the battery pack on the bracket, and the battery pack can be effectively restrained from shaking on an electric vehicle from the vertical direction, thus improving the stability of the battery pack locking, simplifying the locking and unlocking process, and improving the efficiency of the battery pack locking and unlocking.

Preferably, the locking mechanism further comprises a locking bolt, and the locking bolt is used to lock the connecting piece after the connecting piece on the battery pack falls into the locking space to prevent the connecting piece from leaving the locking space, so as to avoid the risk of the battery pack coming out of the bracket after the locking is completed.

The connecting piece on the battery pack is prevented from leaving the locking space on the bracket by the locking bolt, which realizes the stable locking of the battery pack and improves the safety of the battery pack in electric vehicles.

Preferably, the locking bolt is rotatably arranged on the bracket to open or close the opening, and the locking bolt can be switched between a first state position and a second state position;

when the locking bolt is in the first state position, the locking bolt opens the opening, and the connecting piece can enter or leave the locking space;

when the locking bolt is in the second state position, the locking bolt closes the opening, and the connecting piece cannot enter or leave the locking space.

With the above structural arrangement, the opening and closing of the opening of the locking space can be realized by switching the locking bolt between the first state position and the second state position, which simplifies the locking and unlocking operations, improves the efficiency of locking and unlocking, and realizes the purpose of efficiently unlocking or locking the battery pack from or to the bracket.

Preferably, the locking bolt is provided on the bracket by means of a rotating shaft, the rotating shaft is provided on the bracket below the locking space, and the rotating shaft is arranged such that when the connecting piece is located in the locking space, a vertical distance between the axis center of the rotating shaft and the center of the battery pack is greater than a vertical distance between the center of the connecting piece and the center of the battery pack.

With the structural arrangement of the above rotating shaft, when the connecting piece is in the locking space, even if the battery pack shakes on the bracket and causes the connecting piece on the battery pack to squeeze or hit the locking bolt, then the locking bolt cannot be switched to the first state position by an acting force acting on the locking bolt by the connecting piece itself, so that the locking bolt opens the opening and leads to locking failure. Therefore, when the connecting piece is in the locking space, the arrangement of the above described rotating shaft makes the locking bolt have a self-locking effect on the connecting piece, so as to effectively improve the reliability of the locking mechanism for the battery pack.

Preferably, the locking bolt is provided with a stopper portion, the stopper portion opens the opening when the locking bolt is in the first state position; and the stopper portion closes the opening when the locking bolt is in the second state position.

Through the above structural arrangement, the stopper portion formed on the surface of the locking bolt is used to open or close the opening, so that the purpose of unlocking or locking the battery pack from or to the bracket is achieved, and the locking stability of the battery pack is improved.

Preferably, a guide channel leading to the opening is provided on a side of the fixing piece facing a bottom surface of the battery pack, and the guide channel is used for the connecting piece to enter the opening.

With the above structural arrangement, the connecting piece can be guided to enter the opening accurately.

Preferably, the fixing piece comprises a locking body, and a surface of the locking body is provided with a locking groove concave to the inside of the locking body, the locking space is formed in the locking groove, and the opening is formed on the surface of the locking groove.

Preferably, the locking mechanism comprises a locking bolt connected to the locking body, the locking bolt is movable relative to the locking body, and the locking bolt can move between the first state position and the second state position;

when the locking bolt is in the first state position, the locking bolt opens the opening, and the connecting piece can enter or leave the locking space;

when the locking bolt is in the second state position, the locking bolt closes the opening, and the connecting piece cannot enter or leave the locking space.

With the above structural arrangement, the opening and closing of the opening of the locking space can be realized by switching the locking bolt between the first state position and the second state position, which simplifies the locking and unlocking operations, improves the efficiency of locking and unlocking, and realizes the purpose of efficiently unlocking or locking the battery pack on the bracket.

Preferably, the locking bolt is provided on the bracket by means of a rotating shaft, the rotating shaft is provided on the bracket below the locking space, and the rotating shaft is arranged such that when the connecting piece is located in the locking space, the vertical distance between the axis center of the rotating shaft and the center of the battery pack is greater than the vertical distance between the center of the connecting piece and the center of the battery pack.

With the structural arrangement of the above rotating shaft, when the connecting piece is in the locking space, even if the battery pack shakes on the bracket and causes the connecting piece on the battery pack to squeeze or hit the locking bolt, then the locking bolt cannot be switched to the first state position by an acting force acting on the locking bolt by the connecting piece itself, so that the locking bolt opens the opening and leads to locking failure. Therefore, when the connecting piece is in the locking space, the arrangement of the above described rotating shaft makes the locking bolt have a self-locking effect on the connecting piece, so as to effectively improve the reliability of the locking mechanism for the battery pack.

Preferably, the locking bolt is provided with a stopper portion. When the locking bolt is in the first state position, the stopper portion opens the opening; and when the locking bolt is in the second state position, the stopper portion closes the opening.

With the above structural arrangement, the stopper portion formed on the surface of the locking bolt is used to open or close the opening, so that the purpose of unlocking or locking the battery pack from or to the bracket is realized, and the locking stability of the battery pack is improved.

Preferably, a guide channel leading to the opening is provided on a side of the fixing piece facing a bottom surface of the battery pack, and the guide channel is used for the connecting piece to enter the opening to guide the connecting piece to enter the opening accurately.

Preferably, the locking bolt can be rotated to the first state position along a first turning direction under the action of an external force or the thrust of the connecting piece, so that the locking bolt can be switched to the first state position under the action of the external force.

Through the above structural arrangement, the purpose of opening the opening and allowing the connecting piece to enter is realized, simplifying the process of locking the battery pack, and improving the locking efficiency.

Preferably, the locking bolt rotates to the second state position along a second turning direction without the external force, so that the locking bolt is kept in the second state position without the external force.

Through the above structural arrangement, the locking bolt keeps the opening closed, which improves the locking stability of the battery pack.

Preferably, the locking bolt is in the second state position when being located at the opening of the locking groove, and the connecting piece can push the locking bolt to move from the second state position to the first state position.

Using the placement and movement of the battery pack as the source of the external force, the connecting piece pushes the locking bolt to switch to the first state position, so that the connecting piece can also enter the locking space through the opening when the locking bolt is in the second state position, so as to achieve the purpose of making the battery pack enter the lock space quickly and stably.

Preferably, the connecting piece pushes the locking bolt to move from the second state position to the first state position along a first direction, the connecting piece enters the locking space through the opening along a second direction, and the first direction is oriented differently from the second direction.

Through the above structural arrangement, after the connecting piece enters the opening, the connecting piece is locked in the locking space by changing the direction of movement, so as to realize the control of the locking step by controlling the displacement of the connecting piece, which limits the vertical shaking of the battery pack in the locked state.

Preferably, the locking groove forms a guide channel at an opening on the surface of the locking body, and the guide channel is used for the connecting piece to push the locking bolt to move along the first direction.

With the above structural arrangement, the connecting piece can be guided to enter the opening accurately.

Preferably, the opening is provided with a guide chamfer.

Through the above structural arrangement, the guiding reliability of the guide channel is improved.

Preferably, the first direction is a vertical direction, and the second direction is a horizontal direction.

The above structural arrangement is adapted to the placing process when the battery pack is placed on the bracket by the palletizer.

Preferably, the battery pack is carried by a palletizer and placed on the bracket along the first direction, and the palletizer pushes the battery pack into the bracket along the second direction.

Through the above structural arrangement, the control of the locking step is realized by controlling the displacement of the battery pack by the palletizer.

Preferably, when the battery pack is plugged with an electric connection plug of the bracket, the connecting piece enters the locking space through the opening along the second direction.

Through the above structural arrangement, the purpose of locking the connecting piece in the locking space is also achieved during the process of the palletizer pushing the battery pack to be electrically connected to the bracket.

Preferably, the fixing piece further comprises a limiting member, and the limiting member is used to limit the movement of the locking bolt in a direction away from the second state position when the locking bolt is in the first state position;

when the battery pack is plugged with the electric connection plug of the bracket, the locking bolt is located at the second state position, and the connecting piece abuts against the surface of the locking bolt in a direction of pushing the locking bolt away from the second state position.

With the above structural arrangement, when the connecting piece exerts an outward force on the locking bolt in the locking space, it is ensured that the locking bolt effectively and reliably locks the connecting piece in the locking space.

Preferably, the locking bolt has an arc-shaped abutting surface, and the abutting surface is used for directly contacting with the connecting piece, so that the acting force of the connecting piece on the locking bolt can be transmitted in the correct direction.

Through the above structural arrangement, it is ensured that the locking bolt can lock the connecting piece in the locking space.

Preferably, the fixing piece further comprises an elastomer, and the elastomer is used to apply an elastic force to the locking bolt to keep the locking bolt in the second state position when the locking bolt is not affected by an external force.

With the above structural arrangement, after the connecting piece enters the locking space, the locking bolt is driven to return to the second state position by the elastic force of the elastomer to close the opening, thereby improving the stability and safety of the battery pack locking.

Preferably, the elastomer is a tension spring.

With the above structural arrangement, the rebound effect of the locking bolt can be improved.

Preferably, the locking mechanism further comprises a locking bolt connecting rod, which is movably connected to the locking bolt, and the locking bolt connecting rod drives the locking bolt to move from the first state position to the second state position under the action of an external force.

With the above structural arrangement, the purpose of unlocking the battery pack relative to the bracket is achieved.

Preferably, the fixing piece further comprises a driver which is connected to the locking bolt connecting rod, and the driver is used to drive the locking bolt connecting rod to drive the locking bolt to move from the first state position to the second state position, so as to actively drive the locking bolt to switch states.

Through the driver, the locking bolt is driven to switch from the first state position to the second state position by the locking bolt connecting rod, which improves the efficiency of automatic unlocking.

Preferably, the number of the locking mechanisms is multiple, and a plurality of the locking mechanisms are arranged in sequence along a direction of the battery pack entering the bracket, and the locking bolt connecting rods of each of the locking mechanisms are sequentially connected end to end.

With the above structural arrangement, the synchronous control of the plurality of the locking mechanisms is realized through the control of a single locking bolt connecting rod.

Preferably, the fixing piece is connected to the bottom wall of the bracket.

The above structural arrangement provides a preferred embodiment in which the fixing piece is arranged on the bracket.

Preferably, the fixing piece is formed inside the bottom wall of the bracket.

The above structural arrangement provides a preferred embodiment in which the fixing piece is arranged on the bracket.

A locking mechanism for a battery pack which is used to unlock or lock the battery pack from or to a bracket, the locking mechanism comprises:

a connecting piece, wherein the connecting piece is provided on a bottom surface of the battery pack;

a fixing piece, wherein the fixing piece is provided on a bottom wall of the bracket, the fixing piece is provided with a locking space, and the locking mechanism is used to lock the connecting piece in the locking space when the battery pack is placed relative to the bracket;

on a side of the locking space, the locking mechanism is provided with an opening facing towards the battery pack and being close to the battery pack along the vertical direction, so that the connecting piece enters the opening along a vertical direction facing the bottom wall of the bracket and moves into the locking space.

The locking mechanism allows the connecting piece of the battery pack to pass through the opening along the vertical direction and then moves into the locking space, and uses the locking space to fix the connecting piece, so that the battery pack can be fixed relative to the bracket when the battery pack is placed on the bracket by the power exchange equipment such as the palletizer, so as to effectively reduce the complexity of the process and the cumbersome steps of installing and fixing the battery pack on the bracket, and also ensure the reliability of the fixing.

Preferably, the connecting piece comprises a lock head and a base, the base is connected to the battery pack, the lock head is formed at an end of the base away from the battery pack, and the lock head enters and exits the locking space through the opening.

A bracket assembly which comprises a bracket and the locking mechanism for the battery pack as described above.

The locking mechanism of the bracket assembly allows the connecting piece of the battery pack to pass through the opening along the vertical direction and then moves into the locking space, and uses the locking space to fix the connecting piece, so that the battery pack can be fixed relative to the bracket when the battery pack is placed on the bracket by the power exchange equipment such as the palletizer, so as to effectively reduce the complexity of the process and the cumbersome steps of installing and fixing the battery pack on the bracket, and also ensure the reliability of the fixing.

Preferably, a plurality of the locking mechanisms are arranged in sequence along the extending direction of a bottom plate crossbeam of the bracket.

With the above structural arrangement, the fixing ability of the locking mechanism to the battery pack is improved.

Preferably, the bracket is fixed to the lower surface of a chassis beam of an electric vehicle by means of the bottom plate crossbeam, so that the bracket assembly can maintain stability when installed in the electric vehicle.

An electric vehicle which comprises the bracket assembly as described above.

On the bracket assembly of the electric vehicle, the locking mechanism of the bracket assembly allows the connecting piece of the battery pack to pass through the opening along the vertical direction and then moves into the locking space, and uses the locking space to fix the connecting piece, so that the battery pack can be fixed relative to the bracket when the battery pack is placed on the bracket by the power exchange equipment such as the palletizer, so as to effectively reduce the complexity of the process and the cumbersome steps of installing and fixing the battery pack on the bracket, and also ensure the reliability of the fixing.

Preferably, the bracket of the bracket assembly is fixed to the surface of the chassis beam of the electric vehicle by means of a fastener.

In this way, the bracket assembly can maintain stability when installed in the electric vehicle, and the bracket assembly is prevented from generating vibration when the electric vehicle is running.

Preferably, the chassis of the electric vehicle has a left beam and a right beam arranged in parallel; the bracket assembly is arranged on the left beam and the right beam.

With the above structural arrangement, the mounting stability of the bracket assembly is further improved.

Preferably, a bottom plate crossbeam of the bracket of the bracket assembly is integrally formed, and the bottom plate crossbeam is fixed to lower side surfaces of the left beam and the right beam.

With the above structural arrangement, the mounting stability of the bracket assembly is further improved.

A locking method for a battery pack, wherein the locking method for the battery pack uses the above-mentioned locking mechanism for the battery pack, which comprises the following steps:

moving the battery pack so that the connecting piece is close to the opening of the locking mechanism;

moving the battery pack along the vertical direction and controlling the connecting piece to enter the opening;

moving the battery pack along the horizontal direction and controlling the connecting piece to enter the locking space;

controlling the locking mechanism to close the opening to lock the battery pack.

The positive improved effects of the present disclosure are:

In the locking mechanism for battery pack, the bracket assembly, the electric vehicle and the locking method for the battery pack, the locking mechanism allows the connecting piece of the battery pack to pass through the opening in the vertical direction and then moves into the locking space, and uses the locking space to fix the connecting piece, so that the battery pack can be fixed relative to the bracket when the battery pack is placed on the bracket by the power exchange equipment such as the palletizer, so as to effectively reduce the complexity of the process and the cumbersome steps of installing and fixing the battery pack on the bracket, and also ensure the reliability of the fixing.

Figure 1:
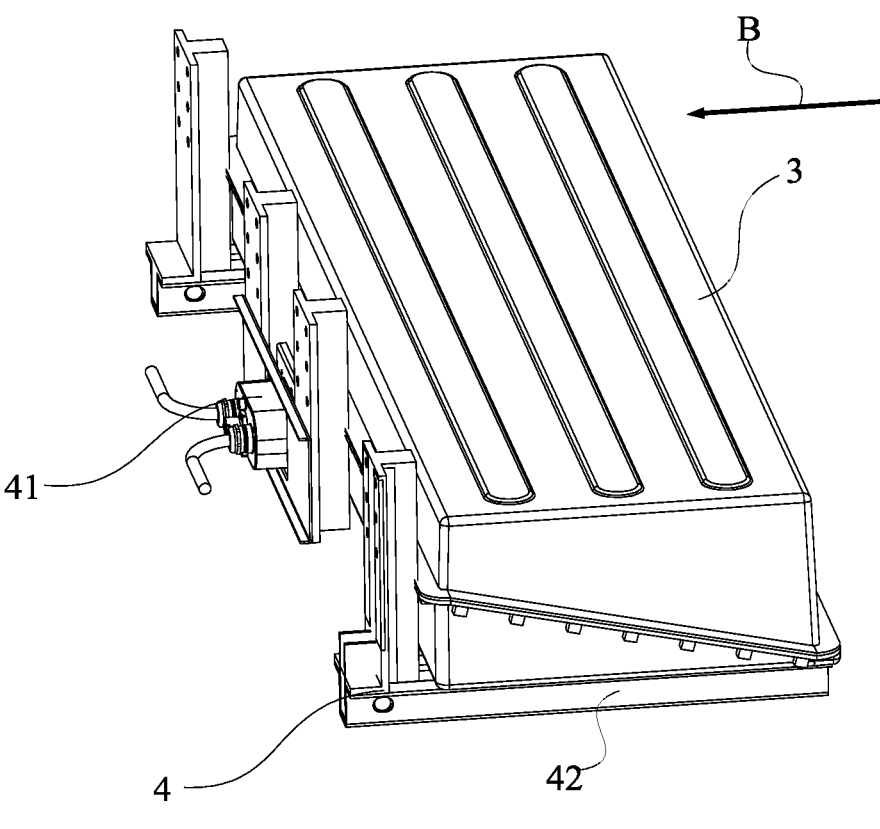
FIG. 1 is a schematic diagram of a locked state of a battery pack and a bracket of an embodiment of the present disclosure.

REFERENCE NUMERALS fixing piece 1, locking space 1a, opening 1b, guide channel 1c; locking bolt 11, stopper portion 11a, abutting surface 11b; rotating shaft 12; locking body 13, locking groove 131; elastomer 14; connecting piece 2, lock head 21, base 22; battery pack 3, bottom wall 3a; bracket 4, bottom wall 4a; electric connection plug 41; bottom plate crossbeam 42; bracket assembly 20; electric vehicle body 5, left beam 51, right beam 52.

DETAILED DESCRIPTION OF THE PREFERRED EMBODIMENT

The following embodiments further illustrate the present disclosure, but the present disclosure is not limited by the following embodiments thereto.

As shown in FIGS. 1-4, the present disclosure provides a locking mechanism for a battery pack, which is used to unlock or lock a battery pack 3 from or to a bracket 4, and the locking mechanism comprises a fixing piece 1 and a connecting piece 2. In this embodiment, the battery pack 3 is carried by a palletizer or other power exchange equipment to enter the bracket 4 along the horizontal direction B.

Figure 2:
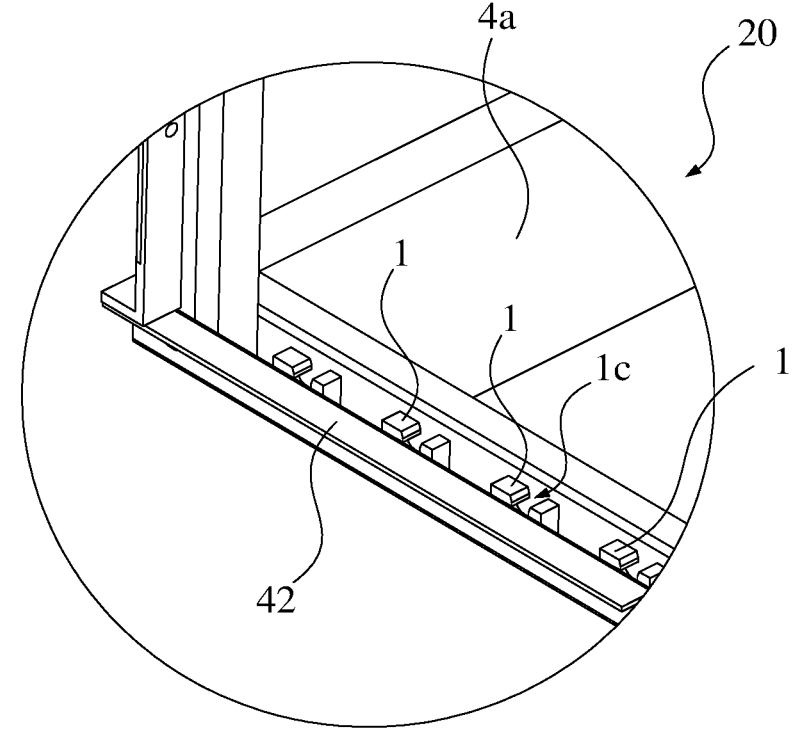
FIG. 2 is a schematic structural diagram of a bracket assembly of an embodiment of the present disclosure.

As shown in FIG. 2, which is a partial structural schematic diagram of a bracket assembly 20 in this embodiment, an electric connection plug 41 is provided on the backside surface of the bracket 4 of the bracket assembly 20 for the plug connection with the battery pack 3. A plurality of fixing pieces 1 of the locking mechanism are distributed on the surface of the bottom wall 4a of the bracket 4, and these fixing pieces 1 of the locking mechanism are arranged in sequence along the direction of the battery pack 3 entering and leaving the bracket 4 (i.e., the horizontal direction B), and are evenly distributed and arranged inside the bottom plate crossbeam 42 along the direction of the battery pack 3 entering relative to the bracket 4. It is certain that when the bracket 4 is provided with a plurality of bottom plate crossbeams 42 arranged in parallel, the fixing pieces 1 of the locking mechanism should be simultaneously arranged on these bottom plate crossbeams 42 to ensure that the battery pack 3 impose the uniform force on the locking mechanism.

Figure 3:
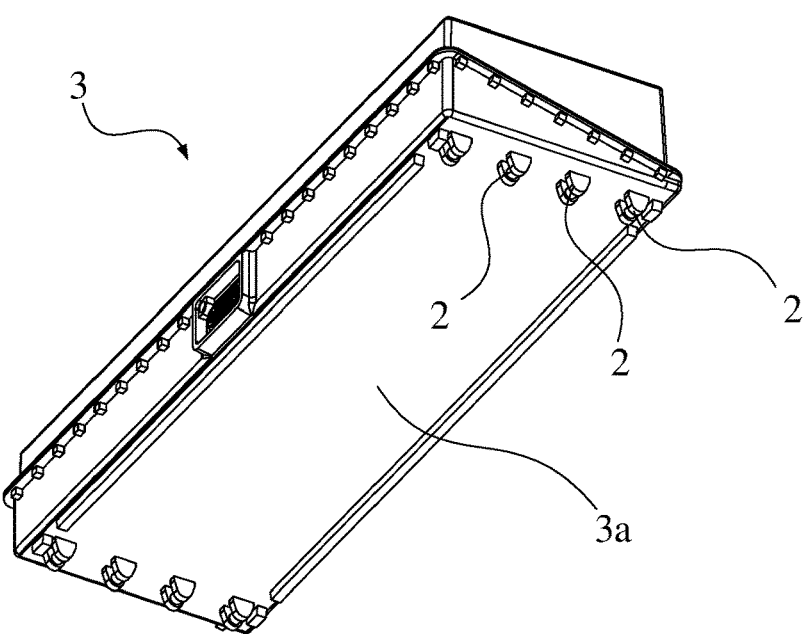
FIG. 3 is a schematic structural diagram of a battery pack of an embodiment of the present disclosure.

As shown in FIG. 3, which is a schematic structural diagram of the battery pack 3 in this embodiment, the battery pack 3 is provided with a plurality of connecting pieces 2 of the locking mechanism corresponding to the surface of the bottom wall 4a of the bracket 4, and these connecting pieces 2 are synchronously provided corresponding to the setting positions of the fixing pieces 1 of the locking mechanism, and these connecting pieces 2 correspond to each fixing piece 1 so as to achieve the locking of the battery pack 3 relative to the bracket 4 by means of positioning the connecting pieces 2 on the fixing pieces 1.

Figure 4:
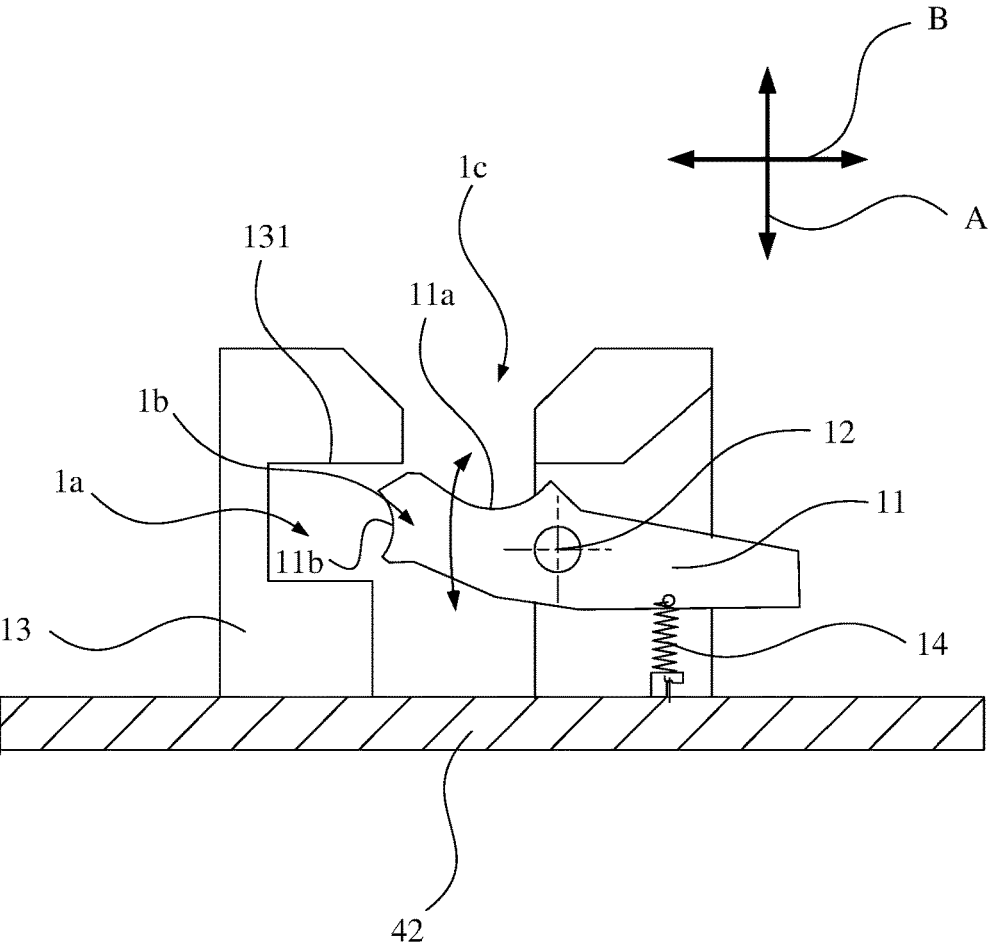
FIG. 4 is a schematic structural diagram of a locking mechanism of an embodiment of the present disclosure.

Herein, as shown in FIG. 4, the fixing piece 1 comprises a locking body 13, and a surface of the locking body 13 is provided with a locking groove 131 concave to the inside of the locking body 13. A locking space 1a is formed in the locking groove 131. On a side of the locking space 1a, the locking body 13 is provided with an opening 1b facing towards the bottom wall 3a of the battery pack 3 and being close to the battery pack 3 along the vertical direction A. The opening 1b is formed on the surface of the locking body 13, so that the connecting piece 2 enters the opening 1b along the vertical direction A facing the bottom wall 4a of the bracket 4, and then moves into the locking space 1a.

The locking mechanism allows the connecting piece 2 of the battery pack 3 to pass through the opening 1b in the vertical direction A and then move into the locking space 1a, and uses the locking space 1a to fix the connecting piece 2, so that the battery pack 3 can be fixed relative to the bracket 4 when the battery pack 3 is placed on the bracket 4 by the power exchange equipment such as the palletizer, so as to effectively reduce the complexity of the process and the cumbersome steps of installing and fixing the battery pack 3 on the bracket 4, and also ensure the reliability of the fixing. By setting the locking mechanism on the bottom wall 4a of the bracket 4, the battery pack 3 is locked during the process of placing the battery pack 3 on the bracket 4, and the battery pack 3 can be effectively restrained from shaking on an electric vehicle from the vertical direction, thus improving the stability of the battery pack 3 locking, simplifying the locking and unlocking process, and improving the efficiency of the battery pack 3 locking and unlocking.

In this embodiment, the locking body 13 is connected to the bottom plate crossbeam 42 of the bracket 4 by means of a fastener. It is certain that in other embodiments, the locking body 13 may also be directly formed on the bottom wall 4a of the bracket 4, that is, the locking space 1a is arranged inside the bracket 4, and the opening 1b is opened on the surface of the bracket 4, so as to realize the same effect as this embodiment.

As shown in FIG. 4, the locking mechanism further comprises a locking bolt 11 connected to the locking body 13. The locking bolt 11 is rotatably arranged on the locking body 13 with a rotating shaft 12 as the center, and can move relative to the locking body 13 by turning over. A stopper portion 11a is provided on the surface of the locking bolt 11, and the locking bolt 11 can be switched between a first state position and a second state position, so as to open or close the opening 1b of the locking body 13 through the stopper portion 11a. When the locking bolt 11 is in the first state position, the stopper portion 11a opens the opening 1b, so that the connecting piece 2 can enter or leave the locking space 1a, that is, the battery pack 3 can enter the bracket 4 or be taken out from the bracket 4. After the connecting piece 2 enters the locking space 1a, the force exerted by the electric connection plug 41 on the bracket 4 on an electric connection socket on the battery pack 3 restricts the connecting piece 2 from continuing to move along the horizontal direction B toward the end plate of the bracket 4. When the locking bolt 11 is in the second state position, the stopper portion 11a closes the opening 1b, so that the connecting piece 2 can not enter or leave the locking space 1a, that is, the battery pack 3 is locked on the bracket 4 to avoid the risk of the battery pack 3 coming out of the bracket 4 after the locking is completed. The connecting piece 2 on the battery pack is prevented from leaving the locking space 1a on the bracket 4 by the locking bolt 1a, which realizes the stable locking of the battery pack 3 and improves the safety of the battery pack 3 in electric vehicles. With the above structural arrangement, the opening and closing of the opening 1b of the locking space can be realized by switching between the first state position and the second state position with the locking bolt 11, which simplifies the locking and unlocking operations, improves the efficiency of locking and unlocking, and realizes the purpose of efficiently unlocking or locking the battery pack from or to the bracket 4, and improves the stability of the battery pack locking.

The locking body 13 also has a guide channel 1c at the position where the opening 1b is provided. The guide channel 1c is used to guide the connecting piece 2 into the opening 1b along the vertical direction A. Therefore, a chamfer is arranged at the surface of the guide channel 1c and the locking body 13 to guide the connecting piece 2 to enter the opening 1b accurately. The fixing piece 1 further comprises an elastomer 14, which is used to apply an elastic force to the locking bolt 11 to keep the locking bolt 11 in the second state position when it is not affected by an external force, so as to continuously maintain the state of closing the opening 1b, and improve the stability and safety of the locking the battery pack 3. Preferably, the elastomer 14 is a tension spring. One end of the tension spring is connected to the locking bolt 11 and the other end is connected to the bottom plate crossbeam 42.

In addition, the connecting piece 2 includes a lock head 21 and a base 22. The base 22 is connected to the surface of the bottom wall 3a of the battery pack 3, and the lock head 21 is formed at the end of the base 22 away from the battery pack 3. The lock head 21 enters and exits the locking space 1a through the opening 1b, realizing the locking relative to the position of the bracket 4.

Figures 5, 6:
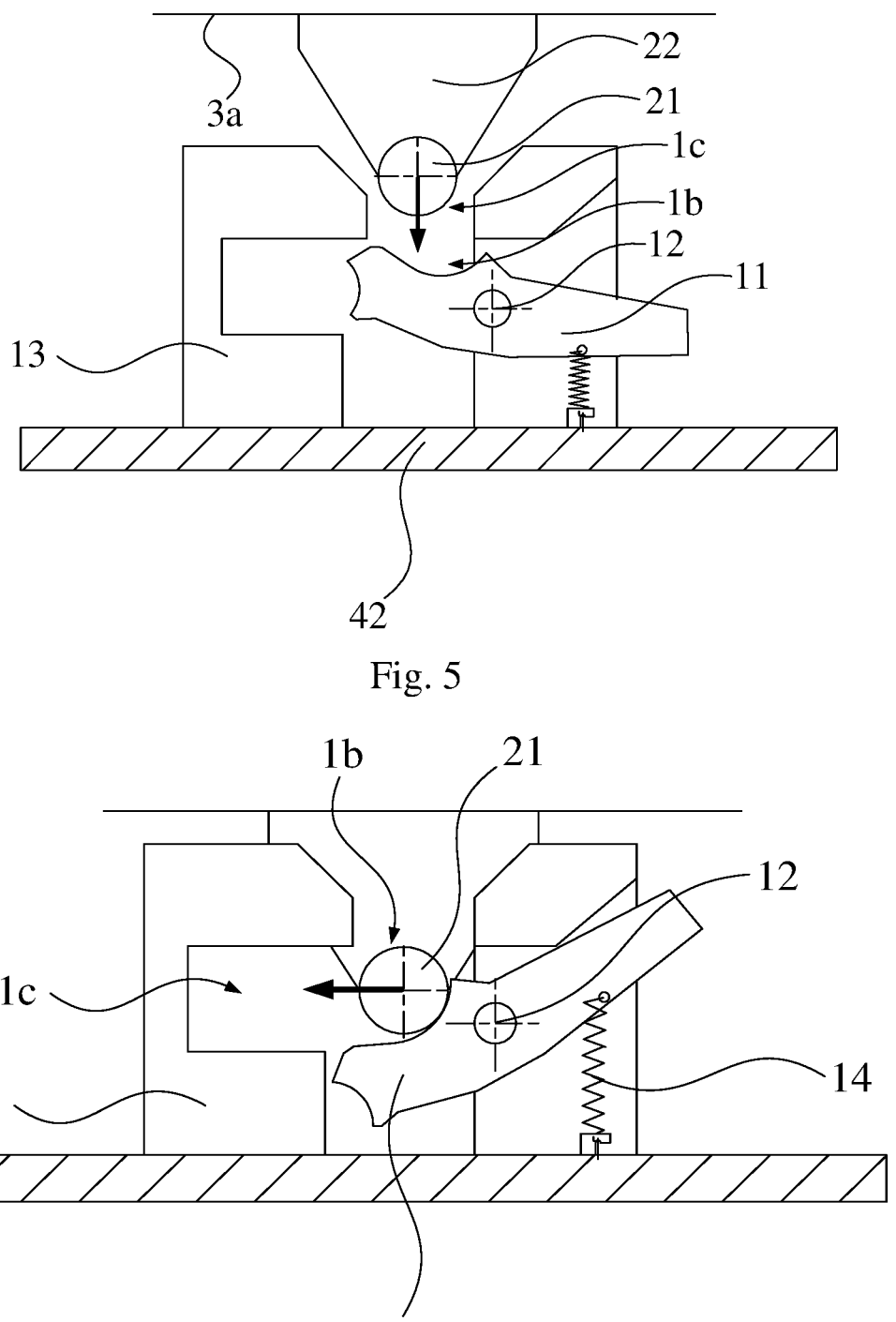
FIG. 5 is a schematic flowchart (I) of the locking process of the locking mechanism of an embodiment of the present disclosure.
FIG. 6 is a schematic flowchart (II) of the locking process of the locking mechanism of an embodiment of the present disclosure.

As shown in FIG. 5, FIG. 5 is a schematic diagram of the positions of the fixing piece 1 and the connecting piece 2 before the battery pack 3 is placed in the bracket 4. In this embodiment, the battery pack 3 is transported above the bracket 4 by a palletizer. As shown in FIG. 6, under the action of the palletizer, the battery pack 3 is placed on the bracket 4 along the vertical direction A. At this time, the connecting piece 2 enters the opening 1b through the guide channel 1c along the vertical downward direction. During the entry process, the connecting piece 2 moves downward and contacts with the locking bolt 11 in the second state position, and exerts a thrust on the locking bolt 11 through the lock head 21, so that the locking bolt 11 rotates to the first state position in a first turning direction (i.e., counterclockwise direction in the figure) with the rotating shaft 12 as the center under the thrust of the connecting piece 2, so that the locking bolt 11 can be switched to the first state position under the vertical downward external force of the connecting piece 2 and the like, so as to realize the purpose of opening the opening 1b and allowing the connecting piece 2 to enter. The locking process of the battery pack 3 is simplified and the locking efficiency is improved. It is certain that in other embodiments, the locking bolt 11 can also be driven by other external forces to rotate to the first state position in the first turning direction centered on the rotating shaft 12 so as to open the opening 1b before the connecting piece 2 enters the opening 1b.

Figure 7:
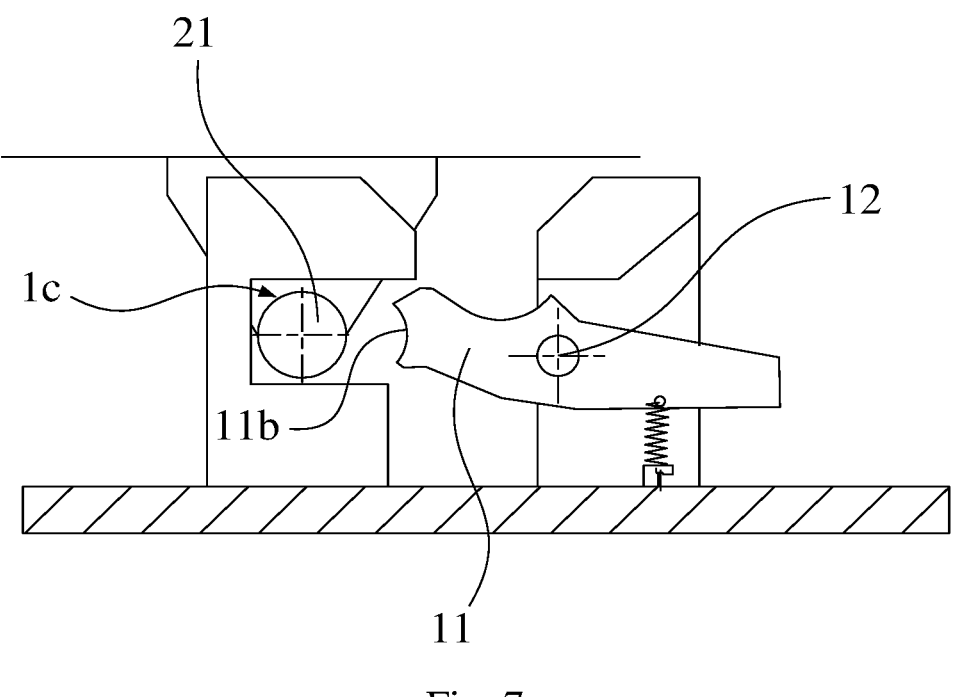
FIG. 7 is a schematic flowchart (III) of the locking process of the locking mechanism of an embodiment of the present disclosure.

Then, as shown in FIG. 7, the palletizer pushes the battery pack 3 into the bracket 4 along the horizontal direction B, and the lock head 21 of the connecting piece 2 also enters the locking space 1a which communicating the opening 1b along the horizontal direction B. At this time, since the locking bolt 11 is not affected by external force, the locking bolt 11 rebounds to the second state position in the second turning direction (i.e., the clockwise direction in the figure) centered on the rotating shaft 12 under the action of the elastomer 14, so as to keep the opening 1b closed.

Herein, the lock head 21 is in a first locking position in the locking space 1a (that is, the position of the lock head 21 in FIG. 7). At this time, since the battery pack 3 is also pushed horizontally by the palletizer, the electric connection socket of the battery pack 3 and the electric connection plug 41 on the bracket 4 are pressed against each other, then the battery pack 3 is electrically connected with the electric connection plug 41 on the bracket 4.

Figure 8:
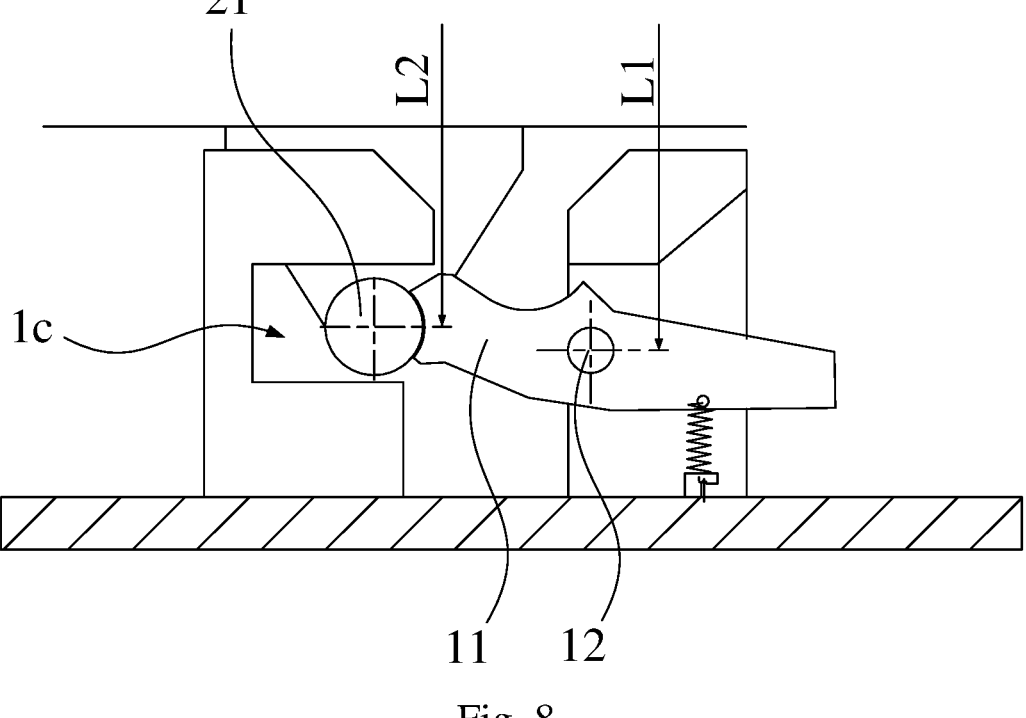
FIG. 8 is a schematic flowchart (IV) of the locking process of the locking mechanism of an embodiment of the present disclosure.

Then, as shown in FIG. 8, after the palletizer removes the horizontal external force pushing the battery pack 3 on the bracket 4, the pressing force between the battery pack 3 and the electric connection plug 41 of the bracket 4 is released, so that the battery pack 3 is horizontally displaced outward, and the lock head 21 is also displaced to a second locking position in the locking space 1a (i.e., the position where the lock head 21 is located in FIG. 8). At this time, the lock head 21 abuts against the locking bolt 11 in the second state position along the horizontal direction B.

At this time, the rotating shaft 12 is set at the lower position of the locking space 1a, and the position of the rotating shaft 12 is specifically arranged such that when the connecting piece 2 is located in the locking space 1a, a vertical distance $L_1$ between the axis center of the rotating shaft 12 and the center (not shown in the figure) of the battery pack 3 is greater than a vertical distance $L_2$ between the center of the connecting piece 2 and the center of the battery pack 3. In this position setting, when the battery pack 3 is subjected to an external force to exit from the locking space 1a along the horizontal direction B, the locking bolt 11 is in the second state position. In this state, even if the connecting piece 2 abuts against the locking bolt 11 along the horizontal outward direction, the locking bolt 11 cannot be pushed to the first state position by the force generated by the connecting piece 2. In other words, with the structural arrangement of the above rotating shaft, when the connecting piece 2 is in the locking space 1a, even if the battery pack 3 shakes on the bracket 4 and causes the connecting piece 2 on the battery pack 3 to squeeze or hit the locking bolt 11, then the locking bolt 11 cannot be switched to the first state position by an acting force acting on the locking bolt 11 by the connecting piece 2 itself, so that the locking bolt 11 opens the opening 1b and leads to locking failure. Therefore, when the connecting piece 2 is in the locking space 1a, the arrangement of the above described rotating shaft makes the locking bolt 11 have a self-locking effect on the connecting piece 2, so as to effectively improve the reliability of the locking mechanism for a battery pack.

In this case, the lock head 21 is pushed against the surface of the locking bolt 11 due to the reaction force generated by the tight insertion of the electric connection plug 2, so that the battery pack 3 is completely positioned on the bracket 4 along the horizontal direction B, so as to avoid the battery pack 3 from moving horizontally in the bracket 4, and to completely restrict the displacement of the battery pack 3 relative to the bracket 4 along the horizontal direction B. At the same time, this solution of limiting displacement can also ensure that the bracket 4 and the battery pack 3 are always in an electrically connected state, thereby improving the reliability of the electric connection.

At the same time, the locking bolt 11 in this embodiment is provided with an arc-shaped concave abutting surface 11b at its end. The role of the butting surface 11b is to abut against the connecting piece 2, increase the contact area between the connecting piece 2 and the locking bolt 11 in the abutting process, so that the acting force of the connecting piece 2 on the locking bolt 11 can be transmitted in the correct direction, the stability of the locking or unlocking process is improved, so as to ensure that the connecting piece 2 can be "self-locked" in the locking space 1a by the locking bolt 11.

As shown in FIGS. 8-11, FIGS. 8-11 are schematic flowcharts of the locking mechanism unlocking the battery pack 3 from the bracket 4 in this embodiment. The unlocking process of the locking mechanism is approximately the same as the locking process described above. As shown in FIG. 8, when the battery pack 3 is locked in the bracket 4 and is positioned at the second locking position, the locking bolt 11 abuts against the locking bolt 11.

Figure 9:
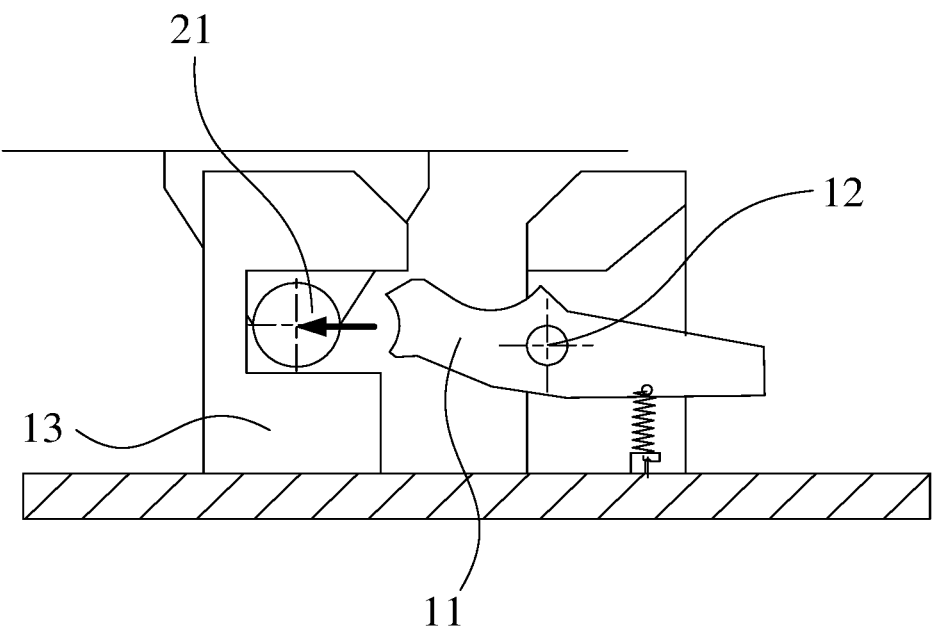
FIG. 9 is a schematic flowchart (I) of the unlocking process of the locking mechanism of an embodiment of the present disclosure.
Figure 10:
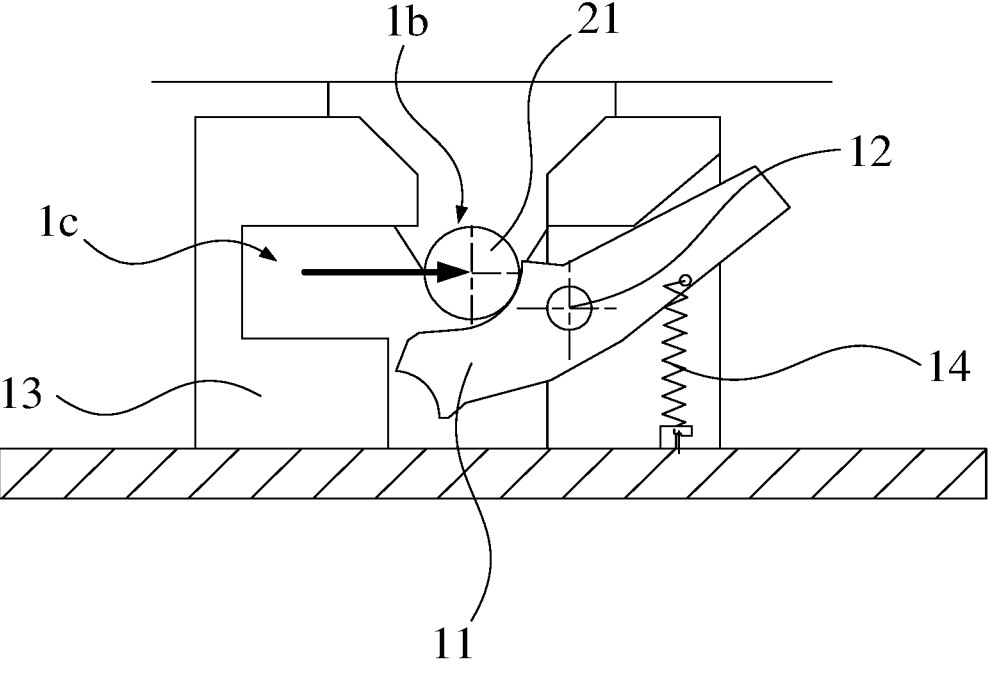
FIG. 10 is a schematic flowchart (II) of the unlocking process of the locking mechanism of an embodiment of the present disclosure.
Figure 11:
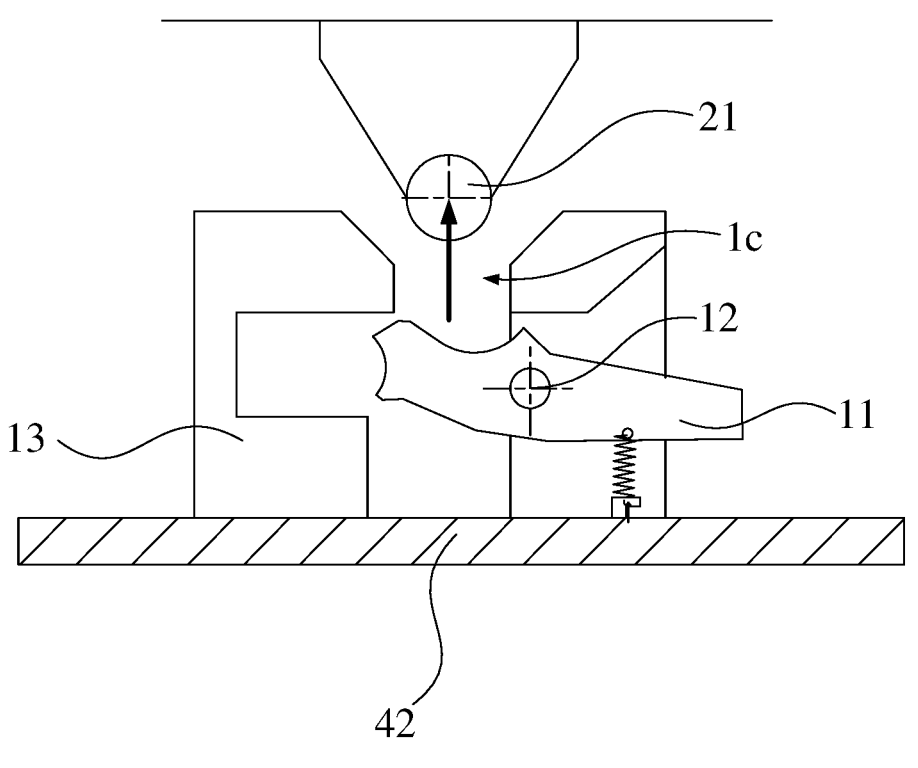
FIG. 11 is a schematic flowchart (III) of the unlocking process of the locking mechanism of an embodiment of the present disclosure.

As shown in FIG. 9, the palletizer pushes the battery pack 3 to the first locking position along the horizontal direction B, so that the locking bolt 11 has enough space to switch back to the first state position, so as to open the opening 1*b* which moves the connecting piece 2 out of the bracket 4 along the horizontal direction. Then, as shown in FIGS. 10 and 11, the battery pack 3 moves horizontally under the action of the palletizer, causing the lock head 21 to move to the position of the opening 1*b*, and then to leave the guide channel 1*c* in a vertical upward direction to achieve the purpose of unlocking the battery pack 3 relative to the bracket 4.

Herein, in the unlocking process, the process of moving the locking bolt 11 from the second state position to the first state position cannot be realized by using the connecting piece 2 to push the locking bolt 11 to switch states as in the locking process. Therefore, in this embodiment, the fixing piece 1 further includes a locking bolt connecting rod (not shown in the figure) and a driver (not shown in the figure), and the driver is indirectly connected to the locking bolt 11 through the locking bolt connecting rod. Driven by the driver, the locking bolt connecting rod drives the locking bolt 11 to move from the second state position to the first state position, so that the connecting piece 2 can move out of the locking space 1*a* along the horizontal direction B during the unlocking process, thereby improving the efficiency of automatic unlocking. Herein, the driver can use the motion mechanism in the prior art to achieve the purpose of driving the locking bolt 11 to move. When the driver is a linear motion mechanism, the locking bolt connecting rod only serves as a connection to transmit linear displacement to the locking bolt 11; when the driver is a rotary motion mechanism, the locking bolt connecting rod also plays a role of changing the direction of motion so as to change the rotary displacement into a linear displacement by a mechanical structure, such as a cam structure. Since the structures of these locking bolt connecting rods belong to the scope of prior art, they will not be repeated here.

In addition, in the case where a plurality of fixing pieces 1 are provided simultaneously on the bottom plate crossbeam 42 of the bracket 4, the locking bolt connecting rods between each of the fixing pieces 1 can be connected end to end to achieve synchronous movement, so that the state position of each fixing piece 1 is switched synchronously.

Figure 12:
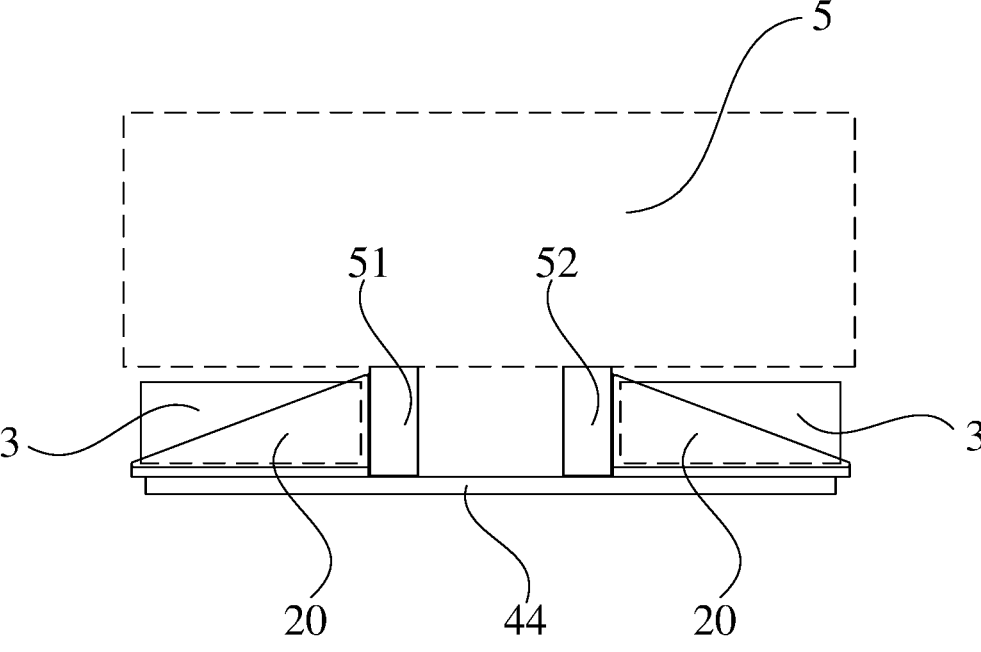
FIG. 12 is a schematic diagram of the connection relationship between an electric vehicle and a bracket assembly of an embodiment of the present disclosure.

The present disclosure also provides an electric vehicle, which adopts the bracket assembly 20 as described above. As shown in FIG. 12, the lower part of the electric vehicle body 5 is provided with a chassis. The chassis comprises a left beam 51 and a right beam 52 arranged in parallel. Two bracket assembly 20 are respectively arranged on the outer sides of the left beam 51 and the right beam 52, and the opening 1*b* is outward, so that the battery pack 3 is mounted on the lower part of the vehicle body from both sides. The bracket assembly 20 is fixed to the chassis by means of a fastener to ensure the stability of the bracket assembly 20 when it is installed on the electric vehicle, and avoid the vibration of the bracket assembly 20 when the electric vehicle is running.

In addition, the bottom plate crossbeam 42 of the bracket 4 of the two bracket assemblies 20 are integrally formed, and the bottom plate crossbeam 42 is fixed on the lower side surfaces of the left frame 51 and the right frame 52 to further improve the mounting stability of the bracket assembly 20. At the same time, the locking mechanism directly fixes the battery pack on the bottom plate crossbeam 42, so that the battery pack is directly connected to the chassis of the electric vehicle by means of the bottom plate crossbeam 42, which can effectively improve the fixing reliability.

The present disclosure also provides a locking method for the battery pack:

1. The battery pack 3 is moved so that the connecting piece 2 is close to the opening 1*b* of the locking mechanism. Specifically, in this embodiment, the battery pack 3 is placed at the corresponding position of the bracket 4 by a palletizer, and the battery pack 3 is moved so that the connecting piece 2 approaches and aligns with the opening 1*b* of the locking mechanism via the guide channel 1*c*.

2. The battery pack 3 is moved along the vertical direction and the connecting piece 2 is controlled to enter the opening; Specifically, the battery pack 3 can be moved along the vertical direction A towards the bracket 4 by the power exchange equipment, and the locking bolt 11 can be pushed to the first state position by the connecting piece 2 to open the opening 1*b*, so that the connecting piece 2 can enter the opening 1*b*.

3. The battery pack 3 is moved along the horizontal direction B and the lock head 21 of the connecting piece 2 is controlled to enter the lock space 1*a*. Specifically, the battery pack 3 is moved horizontally along the horizontal direction B through the power exchange equipment, so that the connecting piece 2 enters the locking space 1*a*.

4. The locking mechanism is controlled to close the opening to lock the battery pack 3, so that the battery pack 3 is locked on the bracket 4. Specifically, after the connecting piece 2 of the battery pack 3 reaches the locking space 1*a*, the movable piece 11 rotates to the second state position under the action of the movable connecting rod 14 to close the opening 1*b*.

5. The battery pack 3 is reversely moved along the horizontal direction B, so that the locking head 21 of the connecting piece 2 abuts against the abutting surface 11*b* of the locking bolt 11. Specifically, after the locking bolt 11 closes the opening 1*b*, the battery pack 3 from which the horizontal thrust exerted by the power exchange equipment is removed moves reversely along the horizontal direction B, and abuts against the abutting surface 11*b* of the locking bolt 11, so that the position of the battery pack 3 relative to the bracket 4 is completely locked.

It is certain that in other embodiments, before the connecting piece 2 enters the opening 1*b*, a power exchange equipment can be used to apply a force on the movable connecting rod 14, so as to drive the movable piece 11 to open the opening 1*b* by the force applied by the power exchange equipment.

The battery pack 3 is locked on the bracket 4 through the above process, so as to effectively reduce the complexity of the process and the cumbersome steps of installing and fixing the battery pack 3 on the bracket 4, and at the same time, the reliability and firmness of the locking of battery pack 3 on bracket 4 can be ensured.

Although the specific embodiments of the present disclosure are described above, it should be understood by those skilled in the art that this is only an example, and the scope of protection of the present disclosure is defined by the appended claims. Those skilled in the art can make various changes or modifications to these embodiments without departing from the principles and essence of the present disclosure, but these changes and modifications fall into the scope of protection of the present disclosure.

What is claimed is:

1. A locking mechanism for a battery pack, wherein the locking mechanism for the battery pack is provided on a bottom wall of a bracket, the locking mechanism is used to unlock or lock the battery pack from or to the bracket, the locking mechanism comprises a fixing piece, the fixing piece being provided with a locking space, and when the battery pack is placed relative to the bracket, the locking mechanism is used to lock a connecting piece on the battery pack in the locking space;

on a side of the locking space, the locking mechanism is provided with an opening facing towards the battery pack and being close to the battery pack along the vertical direction, so that the connecting piece enters the opening along a vertical direction facing the bottom wall of the bracket and moves into the locking space.

2. The locking mechanism for the battery pack as claimed in claim 1, wherein the locking mechanism further comprises a locking bolt, and the locking bolt is used to lock the connecting piece after the connecting piece on the battery pack falls into the locking space to prevent the connecting piece from leaving the locking space.

3. The locking mechanism for the battery pack as claimed in claim 2, wherein the locking bolt is rotatably arranged on the bracket to open or close the opening, and the locking bolt can be switched between a first state position and a second state position;

when the locking bolt is in the first state position, the locking bolt opens the opening, and the connecting piece can enter or leave the locking space;

when the locking bolt is in the second state position, the locking bolt closes the opening, and the connecting piece can not enter or leave the locking space.

4. The locking mechanism for the battery pack as claimed in claim 3, wherein the locking bolt is provided on the bracket by means of a rotating shaft, the rotating shaft is provided on the bracket below the locking space, and the rotating shaft is arranged such that when the connecting piece is located in the locking space, a vertical distance between the axis center of the rotating shaft and the center of the battery pack is greater than a vertical distance between the center of the connecting piece and the center of the battery pack.

5. The locking mechanism for the battery pack as claimed in claim 3, wherein the locking bolt is provided with a stopper portion, the stopper portion opens the opening when the locking bolt is in the first state position; the stopper portion closes the opening when the locking bolt is in the second state position;

and/or, a guide channel leading to the opening is provided on a side of the fixing piece facing a bottom surface of the battery pack, and the guide channel is used for the connecting piece to enter the opening.

6. The locking mechanism for the battery pack as claimed in claim 3, wherein the fixing piece comprises a locking body, and a surface of the locking body is provided with a locking groove concave to the inside of the locking body, the locking space is formed in the locking groove, and the opening is formed on a surface of the locking groove.

7. The locking mechanism for the battery pack as claimed in claim 6, wherein the locking bolt can be rotated to the first state position along a first turning direction under the action of an external force or a thrust of the connecting piece;

and/or, the locking bolt rotates to the second state position along a second turning direction without an external force;

and/or, the locking bolt is in the second state position when being located at the opening of the locking groove, and the connecting piece can push the locking bolt to move from the second state position to the first state position.

8. The locking mechanism for the battery pack as claimed in claim 7, wherein the connecting piece pushes the locking bolt to move from the second state position to the first state position along a first direction, the connecting piece enters the locking space through the opening along a second direction, the first direction is oriented differently from the second direction;

preferably, the locking groove forms a guide channel at an opening on the surface of the locking body, and the guide channel is used for the connecting piece to push the locking bolt to move along the first direction;

more preferably, the opening is provided with a guide chamfer.

9. The locking mechanism for the battery pack as claimed in claim 8, wherein the first direction is a vertical direction, and the second direction is a horizontal direction;

preferably, the battery pack is carried by a palletizer and placed on the bracket along the first direction, the palletizer pushes the battery pack into the bracket along the second direction.

10. The locking mechanism for the battery pack as claimed in claim 9, wherein the connecting piece enters the locking space through the opening along the second direction when the battery pack is plugged with an electric connection plug of the bracket;

preferably, the fixing piece further comprises a limiting member, the limiting member is used to limit the movement of the locking bolt in a direction away from the second state position when the locking bolt is in the first state position;

when the battery pack is plugged with the electric connection plug of the bracket, the locking bolt is located at the second state position, and the connecting piece abuts against a surface of the locking bolt in a direction of pushing the locking bolt away from the second state position;

more preferably, the locking bolt has an arc-shaped abutting surface, and the abutting surface is used for directly contacting with the connecting piece.

11. The locking mechanism for the battery pack as claimed in claim 3, wherein the fixing piece further comprises an elastomer, the elastomer is used to apply an elastic force to the locking bolt to keep the locking bolt in the second state position when the locking bolt is not affected by an external force;

preferably, the elastomer is a tension spring.

12. The locking mechanism for the battery pack as claimed in claim 3, wherein the locking mechanism further comprises a locking bolt connecting rod, the locking bolt connecting rod is movably connected to the locking bolt, and the locking bolt connecting rod drives the locking bolt to move from the first state position to the second state position under the action of an external force;

preferably, the number of the locking mechanisms is multiple, and a plurality of the locking mechanisms are arranged in sequence along a direction of the battery pack entering the bracket, and the locking bolt connecting rods of each of the locking mechanisms are sequentially connected end to end.

13. The locking mechanism for the battery pack as claimed in claim 1, wherein the fixing piece is connected to the bottom wall of the bracket;

and/or, the fixing piece is formed inside the bottom wall of the bracket.

14. A locking mechanism for a battery pack, wherein the locking mechanism for the battery pack is used to unlock or lock the battery pack from or to a bracket, the locking mechanism comprises:

a connecting piece, wherein the connecting piece is provided on a bottom surface of the battery pack;

a fixing piece, wherein the fixing piece is provided on a bottom wall of the bracket, the fixing piece is provided with a locking space, and when the battery pack is placed relative to the bracket, the locking mechanism is used to lock the connecting piece in the locking space;

on a side of the locking space, the locking mechanism is provided with an opening facing towards the battery pack and being close to the battery pack along the vertical direction, so that the connecting piece enters the opening along a vertical direction facing the bottom wall of the bracket and moves into the locking space.

15. The locking mechanism for the battery pack as claimed in claim 14, wherein the connecting piece comprises a lock head and a base, the base is connected to the battery pack, the lock head is formed at an end of the base away from the battery pack, and the lock head enters and exits the locking space through the opening.

16. A bracket assembly, wherein the bracket assembly comprises a bracket and the locking mechanism for the battery pack as claimed in claim 1.

17. The bracket assembly as claimed in claim 16, wherein a plurality of the locking mechanisms are arranged in sequence along the extending direction of a bottom plate crossbeam of the bracket;

preferably, the bracket is fixed to a lower surface of a chassis beam of an electric vehicle by means of the bottom plate crossbeam.

18. An electric vehicle, wherein the electric vehicle comprises the bracket assembly as claimed in claim 16.

19. The electric vehicle as claimed in claim 18, wherein a bracket of the bracket assembly is fixed to the surface of a chassis beam of the electric vehicle by means of a fastener;

preferably, the chassis of the electric vehicle has a left beam and a right beam arranged in parallel;

the bracket assembly is arranged on the left beam and the right beam;

more preferably, a bottom plate crossbeam of the bracket of the bracket assembly is integrally formed, and the bottom plate crossbeam is fixed to lower side surfaces of the left beam and the right beam.

20. A locking method for a battery pack, wherein the locking method for the battery pack uses the locking mechanism for the battery pack as claimed in claim 1, and the locking method for the battery pack comprises the following steps:

moving the battery pack so that the connecting piece is close to the opening of the locking mechanism;

moving the battery pack along the vertical direction and controlling the connecting piece to enter the opening;

moving the battery pack along the horizontal direction and controlling the connecting piece to enter the locking space;

controlling the locking mechanism to close the opening to lock the battery pack.

\* \* \* \* \*